(12) United States Patent
Li et al.

(10) Patent No.: US 12,516,183 B2
(45) Date of Patent: Jan. 6, 2026

(54) LIQUID POLYBUTADIENE, AND PREPARATION METHOD THEREFOR AND APPLICATION THEREOF, COMPOSITION, POLYMER COATING, ADHESIVE, AND CROSSLINKING AGENT

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Jiancheng Li, Beijing (CN); Lin Xu, Beijing (CN); Xue Wang, Beijing (CN); Mingbo Shao, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(*) Notice: Subject to any disclaimer, the term of this patent is extended or adjusted under 35 U.S.C. 154(b) by 582 days.

(21) Appl. No.: 17/999,281

(22) PCT Filed: Oct. 28, 2020

(86) PCT No.: PCT/CN2020/124445
§ 371 (c)(1),
(2) Date: Nov. 18, 2022

(87) PCT Pub. No.: WO2021/232678
PCT Pub. Date: Nov. 25, 2021

(65) Prior Publication Data
US 2023/0192997 A1  Jun. 22, 2023

(30) Foreign Application Priority Data
May 21, 2020 (CN) .......................... 202010436914.8

(51) Int. Cl.
| | |
|---|---|
| *C08L 9/02* | (2006.01) |
| *C08F 2/44* | (2006.01) |
| *C08F 136/06* | (2006.01) |
| *C08K 5/06* | (2006.01) |
| *C08K 5/56* | (2006.01) |
| *C09D 109/00* | (2006.01) |

(52) U.S. Cl.
CPC *C08L 9/02* (2013.01); *C08F 2/44* (2013.01); *C08F 136/06* (2013.01); *C08K 5/06* (2013.01); *C08K 5/56* (2013.01); *C09D 109/00* (2013.01); *C08L 2201/52* (2013.01)

(58) Field of Classification Search
CPC ....................................................... C08K 5/526
See application file for complete search history.

(56) References Cited

U.S. PATENT DOCUMENTS

| | | | | |
|---|---|---|---|---|
| 4,721,749 | A * | 1/1988 | Odar | C08L 9/00 |
| | | | | 524/526 |
| 6,566,478 | B1 * | 5/2003 | Henning | C08L 9/00 |
| | | | | 502/157 |
| 8,283,407 | B2 | 10/2012 | Waddell et al. | |
| 9,546,238 | B2 | 1/2017 | Araki et al. | |
| 10,544,251 | B2 | 1/2020 | Kusanose et al. | |
| 2009/0062451 | A1 | 3/2009 | Yan | |
| 2010/0004413 | A1 | 1/2010 | Luo et al. | |
| 2015/0075839 | A1 | 3/2015 | Sun et al. | |
| 2015/0361257 | A1 | 12/2015 | Sato | |
| 2019/0270832 | A1 | 9/2019 | Ricci et al. | |

FOREIGN PATENT DOCUMENTS

| | | | | | |
|---|---|---|---|---|---|
| CN | 1557847 | A | | 12/2004 | |
| CN | 101280034 | A | | 10/2008 | |
| CN | 103044590 | A | | 4/2013 | |
| CN | 107793534 | A | | 3/2018 | |
| CN | 107805288 | A | | 3/2018 | |
| CN | 107915797 | A | * | 4/2018 | ............ C08F 136/06 |
| CN | 110305240 | B | | 1/2022 | |
| EP | 0588678 | A1 | | 3/1994 | |
| EP | 2075266 | A2 | | 7/2009 | |
| GB | 1125406 | A | | 8/1968 | |
| JP | 1969027469 | B | | 11/1969 | |
| RU | 2192435 | C2 | | 11/2002 | |

OTHER PUBLICATIONS

CN107915797 English Translation. (Year: 2025).*
Forens, Antoine et al.; "Accessible microstructures of polybutadiene by anionic polymerization"; Polymer; vol. 153 (pp. 103-122); Jul. 26, 2018; pp. 1-50.

* cited by examiner

*Primary Examiner* — Christopher M Rodd
(74) *Attorney, Agent, or Firm* — NKL Law; Allen Xue

(57) ABSTRACT

Liquid polybutadiene, and a preparation method therefor and an application thereof are provided. The liquid polybutadiene has a number-average molecular weight of 2,500-5,500 and a molecular weight distribution index of 1-1.2. Based on the total amount of the liquid polybutadiene, the content of a 1,2-structural unit in the liquid polybutadiene is 85-95 wt %, the content of a 1,4-structural unit in the liquid polybutadiene is 5-15 wt %, and the molar ratio of a cis-1,4-structural unit to a trans-1,4-structural unit in the liquid polybutadiene is 1-2:1; and the dynamic viscosity of the liquid polybutadiene at 45° C. is 100-500 P. The liquid polybutadiene has good flowability, good film formability, and good coating performance, and a formed coating has an improved adhesion force to a substrate.

20 Claims, No Drawings

LIQUID POLYBUTADIENE, AND PREPARATION METHOD THEREFOR AND APPLICATION THEREOF, COMPOSITION, POLYMER COATING, ADHESIVE, AND CROSSLINKING AGENT

CROSS REFERENCE TO RELATED APPLICATIONS

This application is a U.S. national stage entry of PCT International Application PCT/CN2020/124445, filed on Oct. 28, 2020, which claims the benefits of Chinese Patent Application 202010436914.8, filed on May 21, 2020, the content of each is incorporated herein by reference in its entirety.

FIELD OF THE INVENTION

The present invention relates to liquid polybutadiene, and a preparation method therefor and an application thereof; the present invention also relates to a composition including the liquid polybutadiene; and the present invention further relates to a polymer coating including the liquid polybutadiene and the composition, an adhesive including the liquid polybutadiene and the composition and a crosslinking agent including the liquid polybutadiene and the composition.

BACKGROUND OF THE INVENTION

Liquid polybutadiene is a viscous flowable polymer with a number-average molecular weight of 500-10000, an oily liquid at normal temperature, and is widely used in coatings, inks, surfactants, and polymer modifiers, etc.

According to the microstructural classification, liquid polybutadiene can be classified into 1,4-addition (cis and trans isomers) and 1,2-addition products, and according to the content of vinyl, the 1,2-addition products can be classified into medium vinyl liquid polybutadiene and high vinyl liquid polybutadiene.

High vinyl liquid polybutadiene refers to liquid polybutadiene having a 1,2-structure content of 65 wt % or more, and is generally prepared by using iron-, cobalt- and molybdenum-based catalysts, but the catalyst system has the following disadvantages: (1) preparation of low-molecular-weight liquid polybutadiene is difficult to achieve; (2) molecular weight distribution is broad, and peel strength is low; and (3) variable valence metals are included, and the weather resistance is poor.

Therefore, it is necessary to develop liquid polybutadiene with high vinyl content and narrow molecular weight distribution.

SUMMARY OF THE INVENTION

The present invention aims to provide liquid polybutadiene which is not only high in vinyl content but also narrow in molecular weight distribution, while also having suitable molecular weight and dynamic viscosity.

According to a first aspect of the present invention, the present invention provides liquid polybutadiene, wherein the liquid polybutadiene has a number-average molecular weight of 2,500-5,500, and a molecular weight distribution index of 1-1.2; based on the total amount of the liquid polybutadiene, the content of a 1,2-structural unit in the liquid polybutadiene is 85-95 wt %, the content of a 1,4-structural unit in the liquid polybutadiene is 5-15 wt %, and a molar ratio of a cis-1,4-structural unit to a trans-1,4-structural unit in the liquid polybutadiene is 1-2:1; and the dynamic viscosity of the liquid polybutadiene at 45° C. is 100-500 P.

According to a second aspect of the present invention, the present invention provides a preparation method for liquid polybutadiene, comprising contacting 1,3-butadiene with a structure modifier and an organolithium initiator in a polymerization solvent under anionic polymerization reaction conditions to obtain a polymerization reaction mixture containing polybutadiene, wherein the contacting is carried out at a temperature of −10° C. to 20° C.; the structure modifier comprises a component A and a component B, wherein the component A is one or two or more selected from ethers and amines, and the component B is one or two or more selected from alkali metal alkoxides; a molar ratio of the organolithium initiator to the component A to the component B is 1:0.05-0.3:0.03-0.2; and the organolithium initiator is based on lithium;

the component A is one or two or more selected from a compound shown in a formula I and a compound shown in a formula II,

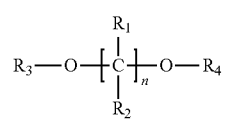
(Formula I)

in the formula I, $R_1$ and $R_2$ are the same or different, and are each independently a hydrogen atom or $C_1$-$C_6$ alkyl, $R_3$ and $R_4$ are the same or different, and are each independently $C_1$-$C_6$ alkyl, and n is an integer of 1-5;

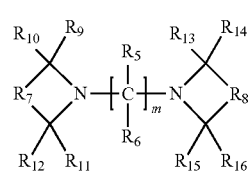
(Formula II)

in the formula II, $R_5$ and $R_6$ are the same or different, and are each independently a hydrogen atom or $C_1$-$C_6$ alkyl, $R_7$ and $R_8$ are the same or different, and are each independently $C_1$-$C_6$ alkylene, and $R_9$, $R_{10}$, $R_{11}$, $R_{12}$, $R_{13}$, $R_{14}$, $R_{15}$, and $R_{16}$ are the same or different, and are each independently a hydrogen atom or $C_1$-$C_6$ alkyl, and m is an integer of 1-5.

According to a third aspect of the present invention, the present invention provides liquid polybutadiene prepared by the method according to the second aspect of the present invention.

According to a fourth aspect of the present invention, the present invention provides a composition, comprising liquid polybutadiene and at least one additive, wherein the liquid polybutadiene is the liquid polybutadiene according to the first or third aspect of the present invention.

According to a fifth aspect of the present invention, the present invention provides a polymer coating, comprising the liquid polybutadiene according to the first or third aspect of the present invention, or the composition according to the fourth aspect of the present invention.

According to a sixth aspect of the present invention, the present invention provides an adhesive, comprising the liquid polybutadiene according to the first or third aspect of the present invention, or the composition according to the fourth aspect of the present invention.

According to a seventh aspect of the present invention, the present invention provides a crosslinking agent, comprising the liquid polybutadiene according to the first or third aspect of the present invention, or the composition according to the fourth aspect of the present invention.

According to an eighth aspect of the present invention, the present invention provides application of the liquid polybutadiene according to the first or third aspect of the present invention, or the composition according to the fourth aspect of the present invention as a crosslinking agent, an adhesive or an electrically insulating material.

The liquid polybutadiene according to the present invention not only has a high vinyl content but also has a narrow molecular weight distribution and at the same time has a suitable molecular weight and dynamic viscosity. The liquid polybutadiene according to the present invention has good flowability, good film formability, and good coating performance, and is particularly suitable for forming a polymer coating, and the formed polymer coating has an improved adhesion force to a substrate. The liquid polybutadiene according to the present invention has good application prospects in the fields of crosslinking agents, adhesives and electrically insulating materials.

DETAILED DESCRIPTION OF THE EMBODIMENTS

The endpoints and any values of the ranges disclosed herein are not limited to the precise range or value, and these ranges or values should be understood as including values close to these ranges or values. For numerical ranges, the endpoint values of each range, the endpoint values of each range and individual point values, and individual point values may be combined with each other to obtain one or more new numerical ranges, and these numerical ranges should be considered to be specifically disclosed herein.

In the present invention, the term "liquid polybutadiene" refers to polybutadiene having fluidity at a temperature of 25° C.

According to a first aspect of the present invention, the present invention provides liquid polybutadiene, wherein the liquid polybutadiene has a number-average molecular weight of 2,500-5,500, and a molecular weight distribution index of 1-1.2; based on the total amount of the liquid polybutadiene, the content of a 1,2-structural unit in the liquid polybutadiene is 85-95 wt %, the content of a 1,4-structural unit in the liquid polybutadiene is 5-15 wt %, and a molar ratio of a cis-1,4-structural unit to a trans-1,4-structural unit in the liquid polybutadiene is 1-2:1; and the dynamic viscosity of the liquid polybutadiene at 45° C. is 100-500 P.

According to the liquid polybutadiene of the present invention, the liquid polybutadiene has a number-average molecular weight ($M_n$) of 2,500-5,500. Preferably, the liquid polybutadiene has a number-average molecular weight of 2,800-5,000. More preferably, the liquid polybutadiene has a number-average molecular weight of 3,000-4,500.

According to the liquid polybutadiene of the present invention, the liquid polybutadiene has a molecular weight distribution index ($M_w/M_n$) of 1-1.2. According to the liquid polybutadiene of the present invention, the molecular weight distribution index of the liquid polybutadiene is preferably 1.01-1.09, more preferably 1.02-1.06.

In the present invention, the molecular weight and molecular weight distribution index of the liquid polybutadiene are determined by using gel permeation chromatography, wherein the gel permeation chromatography adopts a gel permeation chromatograph HLC-8320 from Tosoh Corp, a chromatographic column is TSKgel SuperMultiporeHZ-N, a standard column is TSKgel SuperMultiporeHZ, a solvent is chromatographically pure tetrahydrofuran (THF), narrow distribution polystyrene is used as a standard sample, a polymer sample is prepared into a tetrahydrofuran solution at a mass concentration of 1 mg/mL, an injection volume is 10.00 μL, a flow rate is 0.35 mL/min, and the test temperature is 40.0° C.

According to the liquid polybutadiene of the present invention, the content of a 1,2-structural unit in the liquid polybutadiene is 85-95 wt % based on the total amount of the liquid polybutadiene. Preferably, based on the total amount of the liquid polybutadiene, the content of the 1,2-structural unit in the liquid polybutadiene is 87 wt % or more, and may be, for example, 87-94 wt %. More preferably, the content of the 1,2-structural unit in the liquid polybutadiene is 90 wt % or more, preferably 90-93 wt %, such as 90, 90.1, 90.2, 90.3, 90.4, 90.5, 90.6, 90.7, 90.8, 90.9, 91, 91.1, 91.2, 91.3, 91.4, 91.5, 91.6, 91.7, 91.8, 91.9, 92, 92.1, 92.2, 92.3, 92.4, 92.5, 92.6, 92.7, 92.8, 92.9 or 93 wt % based on the total amount of the liquid polybutadiene.

According to the liquid polybutadiene of the present invention, the content of a 1,4-structural unit in the liquid polybutadiene is 5-15 wt %. According to the liquid polybutadiene of the present invention, a molar ratio of a cis-1,4-structural unit to a trans-1,4-structural unit in the liquid polybutadiene is 1-2:1, preferably 1.3-1.9:1. According to the liquid polybutadiene of the present invention, in one preferred example, the molar ratio of the cis-1,4-structural unit to the trans-1,4-structural unit in the liquid polybutadiene is 1.65-1.75:1. A polymer coating formed according to the liquid polybutadiene in this preferred example has a higher adhesion force to a substrate, showing higher peel strength.

In the present invention, the term "1,2-structural unit" refers to a structural unit formed by 1,2-polymerization of butadiene, and the content of the 1,2-structural unit may also be referred to as the vinyl content; and in the present invention, the term "1,4-structural unit" refers to a structural unit formed by 1,4-polymerization of butadiene.

In the present invention, the term "cis-1,4-structural unit" refers to a structural unit formed by 1,4-polymerization of butadiene and having a cis configuration, that is, a structural unit represented by the following formula:

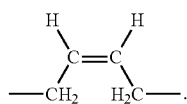

In the present invention, the term "trans-1,4-structural unit" refers to a structural unit formed by 1,4-polymerization of butadiene and having a trans configuration, that is, a structural unit represented by the following formula:

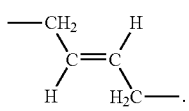

In the present invention, the content of the 1,2-structural unit, the 1,4-structural unit, the cis-1,4-structural unit, and the trans-1,4-structural unit is determined by using nuclear magnetic resonance spectroscopy, and a specific test method is as follows: a test is performed by using a Bruker AVANCE 400 type superconducting nuclear magnetic resonance spectrometer, wherein a resonance frequency of $^1H$ nucleus is 300.13 MHz, a spectral width is 2747.253 Hz, a pulse width is 5.0 μs, a data point is 16 K, a sample tube has a diameter of 5 mm, a solvent is deuterated chloroform ($CDCl_3$), the sample concentration is 15 mg/mL, the test temperature is normal temperature, the number of scans is 16, and calibration is performed with a tetramethylsilane chemical shift being 0 ppm.

According to the liquid polybutadiene of the present invention, the liquid polybutadiene has a dynamic viscosity of 100-500 Poise (P) at 45° C., has good flowability and is particularly suitable for use in coatings and adhesives. Preferably, the liquid polybutadiene according to the present invention has a dynamic viscosity of 150-350 P at 45° C. More preferably, the liquid polybutadiene according to the present invention has a dynamic viscosity of 170-300 P at 45° C. Further preferably, the liquid polybutadiene according to the present invention has a dynamic viscosity of 180-250 P at 45° C.

The dynamic viscosity of the liquid polybutadiene according to the present invention has little change with the molecular weight, and the liquid polybutadiene can exhibit a suitable dynamic viscosity in a wide range. According to the liquid polybutadiene of the present invention, in one preferred example, the liquid polybutadiene has a number-average molecular weight of 2,500-4,000, preferably 3,000-4,000, and the dynamic viscosity of the liquid polybutadiene at 45° C. is 100-280 P, preferably 150-260 P. In this preferred example, the molecular weight distribution index of the liquid polybutadiene may be 1-1.05.

According to the liquid polybutadiene of the present invention, in another preferred example, the number-average molecular weight of the liquid polybutadiene is greater than 4,000 and not more than 5,500, and the dynamic viscosity of the liquid polybutadiene at 45° C. is greater than 280 P and not more than 500 P, preferably 280-480 P. In this preferred example, the molecular weight distribution index of the liquid polybutadiene may be 1-1.08.

In the present invention, the dynamic viscosity is determined with reference to the capillary method specified in GBT10247-2008, wherein the dynamic viscosity is determined by using an Ubbelohde viscometer with a size number of 4B at a temperature of 45° C.

According to the liquid polybutadiene of the present invention, the liquid polybutadiene has a glass transition temperature ($T_g$) of −32° C. to −12° C., preferably −29° C. to −15° C., more preferably −27° C. to −17° C.

In the present invention, the glass transition temperature is determined by differential scanning calorimetry, and a specific test method is as follows: determination is performed by using a TA-2980 DSC differential scanning calorimeter according to the method specified in "GB/T 29611-2013 Raw Rubber, Glass Transition Temperature", with a heating rate of 20° C./min.

According to the liquid polybutadiene of the present invention, the weight content of metal elements in the liquid polybutadiene may be 200 ppm or less, preferably 100 ppm or less, more preferably 50 ppm or less, further preferably 20 ppm or less based on the total amount of the liquid polybutadiene.

In the present invention, the content of metal elements in the liquid polybutadiene is determined by a plasma method, and a specific test method is as follows: an Optima 8300 full spectrum direct reading ICP spectrometer from Perkin Elmer (PE), USA, equipped with an echelle grating, a solid state detector, and dual optical path dual solid state detectors in the ultraviolet and visible regions is used, and a flat panel plasma technology is used; and the instrument operating parameters are as follows: a high frequency power of 1300 W, a plasma airflow of 15 L/min, an atomizing gasflow of 0.55 L/min, an auxiliary gasflow of 0.2 L/min, a peristaltic pump speed of 1.50 mL/min, the integration time of 10 s, and plasma axial observation. A sample preparation method is as follows: 2.000 g of a sample is accurately weighed in a porcelain crucible, the porcelain crucible with the sample is placed in a high temperature resistance furnace and gradually heated to 500° C., after ashing is completed, the ashed material is taken out, 5 mL of 10 vol % diluted nitric acid is added, followed by slowly heating on a hot plate until the ashed material is completely dissolved, the obtained solution is evaporated to dryness, 1 mL of concentrated nitric acid (a concentration of 68 vol %) is added, the resulting solution is transferred into a 50 mL volumetric flask, and the volume is made up with water to a constant volume while preparing a reagent blank solution.

According to a second aspect of the present invention, the present invention provides a preparation method for liquid polybutadiene, comprising contacting 1,3-butadiene with a structure modifier and an organolithium initiator in a polymerization solvent under anionic polymerization conditions to obtain a polymerization reaction mixture containing polybutadiene, wherein the contacting is carried out at a temperature of not more than 40° C.

According to the preparation method of the present invention, the structure modifier includes a component A and a component B, wherein the component A is one or two or more selected from ethers and amines, and the component B is one or two or more selected from alkali metal alkoxides.

According to the preparation method of the present invention, the component A is one or two or more selected from a compound shown in a formula I and a compound shown in a formula II:

(Formula I)

in the formula I, $R_1$ and $R_2$ are the same or different, and are each independently a hydrogen atom or $C_1$-$C_6$ alkyl, $R_3$ and $R_4$ are the same or different, and are each independently $C_1$-$C_6$ alkyl, and n is an integer of 1-5, and may be, for example, 1, 2, 3, 4 or 5;

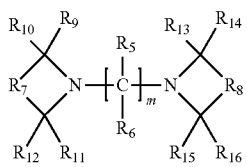

(Formula II)

in the formula II, $R_5$ and $R_6$ are the same or different, and are each independently a hydrogen atom or $C_1$-$C_6$ alkyl, $R_7$ and $R_8$ are the same or different, and are each independently $C_1$-$C_6$ alkylene, and $R_9$, $R_{10}$, $R_{11}$, $R_{12}$, $R_{13}$, $R_{14}$, $R_{15}$, and $R_{16}$ are the same or different, and are each independently a hydrogen atom or $C_1$-$C_6$ alkyl, and m is an integer of 1-5, and may be, for example, 1, 2, 3, 4, or 5.

In the formulas I and II, the $C_1$-$C_6$ alkyl includes linear $C_1$-$C_6$ alkyl and branched $C_3$-$C_6$ alkyl, and specific examples of the $C_1$-$C_6$ alkyl may include, but are not limited to, methyl, ethyl, n-propyl, isopropyl, n-butyl, sec-butyl, isobutyl, tert-butyl, n-pentyl, isopentyl, tert-pentyl, neopentyl, and n-hexyl.

In one preferred embodiment, in the formula I, $R_1$ and $R_2$ are both hydrogen atoms; and $R_3$ and $R_4$ are the same and are methyl, ethyl, n-propyl or n-butyl.

In one preferred embodiment, in the formula II, $R_5$ and $R_6$ are both hydrogen atoms, $R_7$ and $R_8$ are $C_2$-$C_4$ alkylene, and $R_9$, $R_{10}$, $R_{11}$, $R_{12}$, $R_{13}$, $R_{14}$, $R_{15}$ and $R_{16}$ are all hydrogen atoms.

According to the preparation method of the present invention, preferred examples of the component A may include, but are not limited to, one or two or more of diethylene glycol dimethyl ether, diethylene glycol diethyl ether, diethylene glycol di-n-propyl ether, diethylene glycol di-n-butyl ether, and 1,2-dipiperidinylethane.

The alkali metal alkoxide is preferably one or two or more selected from compounds represented by a formula III,

 (Formula III)

In the formula III, $R_{17}$ is $C_1$-$C_{20}$ alkyl, $C_6$-$C_{30}$ aryl, or $C_4$-$C_{20}$ cycloalkyl, preferably $C_2$-$C_{10}$ alkyl or $C_6$-$C_{12}$ cycloalkyl, more preferably $C_2$-$C_6$ alkyl; and M is an alkali metal atom and may be, for example, Li, Na or K, preferably Na.

In the formula III, the $C_1$-$C_{20}$ alkyl includes linear $C_1$-$C_{20}$ alkyl and branched $C_3$-$C_{20}$ alkyl, and specific examples of the $C_1$-$C_{20}$ alkyl may include, but are not limited to: methyl, ethyl, n-propyl, isopropyl, n-butyl, sec-butyl, isobutyl, tert-butyl, n-pentyl and isomers thereof, n-hexyl and isomers thereof, n-heptyl and isomers thereof, n-octyl and isomers thereof, n-nonyl and isomers thereof, n-decyl and isomers thereof, undecyl and isomers thereof, dodecyl and isomers thereof, tridecyl and isomers thereof, tetradecyl and isomers thereof, pentadecyl and isomers thereof, hexadecyl and isomers thereof, heptadecyl and isomers thereof, octadecyl and isomers thereof, nonadecyl and isomers thereof, and eicosyl and isomers thereof.

In the formula III, the $C_4$-$C_{20}$ cycloalkyl includes cyclopropyl, cyclopentyl, cyclohexyl, 4-methylcyclohexyl, 4-ethylcyclohexyl, 4-n-propylcyclohexyl, 4-n-butylcyclohexyl, or 2-isopropyl-5-methylcyclohexyl.

According to the preparation method of the present invention, preferred examples of the alkali metal alkoxide may include, but are not limited to, one or two or more of sodium tert-butoxide, sodium tert-amylate, sodium mentholate, sodium ethoxide, and sodium n-hexylate.

According to the preparation method of the present invention, a molar ratio of the organolithium initiator to the component A to the component B is 1:0.05-0.3:0.03-0.2, and the organolithium initiator is based on lithium. Preferably, the molar ratio of the organolithium initiator to the component A to the component B is 1:0.08-0.25:0.04-0.18, and the organolithium initiator is based on lithium. More preferably, the molar ratio of organolithium initiator to the component A to the component B is 1:0.1-0.2:0.05-0.15, and the organolithium initiator is based on lithium. According to the preparation method of the present invention, a molar ratio of the component B to the component A is preferably 0.4-1.5:1, more preferably 0.5-1:1.

According to the preparation method of the present invention, the organolithium initiator is preferably an organolithium compound, more preferably a compound shown in a formula IV, $$R_{18}Li \quad \text{(Formula IV)}$$

In the formula IV, $R_{18}$ is $C_1$-$C_6$ alkyl, $C_3$-$C_{12}$ cycloalkyl, $C_7$-$C_{14}$ aralkyl, or $C_6$-$C_{12}$ aryl.

In the formula IV, the $C_1$-$C_6$ alkyl includes linear $C_1$-$C_6$ alkyl and branched $C_3$-$C_6$ alkyl, and specific examples of the $C_1$-$C_6$ alkyl can include, but are not limited to, methyl, ethyl, n-propyl, isopropyl, n-butyl, sec-butyl, isobutyl, tert-butyl, n-pentyl, isopentyl, tert-pentyl, neopentyl, and n-hexyl.

In the formula IV, specific examples of the $C_3$-$C_{12}$ cycloalkyl can include, but are not limited to, cyclopropyl, cyclopentyl, cyclohexyl, 4-methylcyclohexyl, 4-ethylcyclohexyl, 4-n-propylcyclohexyl, and 4-n-butylcyclohexyl.

In the formula IV, specific examples of the $C_7$-$C_{14}$ aralkyl can include, but are not limited to, phenylmethyl, phenylethyl, phenyl n-propyl, phenyl n-butyl, phenyl tert-butyl, phenylisopropyl, phenyl n-pentyl, and phenyl n-butyl.

In the formula IV, specific examples of the $C_6$-$C_{12}$ aryl can include, but are not limited to, phenyl, naphthyl, 4-methylphenyl, and 4-ethylphenyl.

According to the preparation method of the present invention, specific examples of the organolithium initiator may include, but are not limited to, one or two or more of ethyllithium, n-propyllithium, isopropyllithium, n-butyllithium, sec-butyllithium, tert-butyllithium, phenyllithium, 2-naphthyllithium, 4-butylphenyllithium, 4-tolyllithium, cyclohexyllithium, and 4-butylcyclohexyllithium. Preferably, the organolithium initiator is n-butyllithium and/or sec-butyllithium, more preferably, the organolithium initiator is n-butyllithium.

The usage amount of the organolithium initiator can be selected according to the expected molecular weight of the liquid polybutadiene. Preferably, the organolithium initiator is used in an amount such that the prepared liquid polybutadiene has a number-average molecular weight of 2,500-5,500, preferably 2,800-5,000, more preferably 3,000-4,500. Methods for determining the specific usage amount of the organolithium initiator according to the expected polymer molecular weight are well known to those skilled in the art and will not be detailed herein.

According to the preparation method of the present invention, the polymerization solvent may be various organic substances capable of acting as a reaction medium and allowing the polymerization reaction to be carried out under solution polymerization conditions, and may be, for example, a hydrocarbon solvent. The polymerization solvent may be one or two or more selected from cyclohexane, n-hexane, n-pentane, n-heptane, benzene, and raffinate oil.

The raffinate oil is distillate oil remaining after extraction of aromatics from an aromatic-rich catalytic reformate during petroleum refining. The polymerization solvent may be used alone or in admixture.

According to the preparation method of the present invention, based on the total amount of the polymerization solvent and 1,3-butadiene, the content of 1,3-butadiene (i.e. the monomer content) may be 1-15 wt %, preferably 2-12 wt %, more preferably 4-10 wt %. In the present invention, the monomer content refers to the weight percent content of 1,3-butadiene determined based on the total amount of the polymerization solvent and the 1,3-butadiene before the polymerization reaction is carried out.

According to the preparation method of the present invention, 1,3-butadiene is contacted with the structure modifier and the organolithium initiator in the polymerization solvent at a temperature of −10° C. to 20° C., thereby performing an anionic polymerization reaction, for example, 1,3-butadiene is contacted with the structure modifier and the organolithium initiator at a temperature of −10° C., −9° C., −8° C., −7° C., −6° C., −5° C., −4° C., −3° C., −2° C., −1° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., or 20° C. More preferably, 1,3-butadiene is contacted with the structure modifier and the organolithium initiator at a temperature of not more than 10° C., such as at a temperature of −5° C. to 10° C.

According to the preparation method of the present invention, the anionic polymerization reaction may be carried out under a pressure of 0.005-1.5 MPa, more preferably under a pressure of 0.1-1 MPa. In the present invention, the pressure refers to a gauge pressure. According to the preparation method of the present invention, the time of the anionic polymerization reaction may be selected according to the temperature of the polymerization reaction and may generally be 30-240 min, preferably 40-120 min.

According to the preparation method of the present invention, the anionic polymerization reaction is carried out in an atmosphere formed by an inactive gas. The inactive gas refers to gas that does not chemically interact with reactants, reaction products, and the solvent under the polymerization conditions, e.g., nitrogen and/or a group zero element gas (e.g., argon).

According to the preparation method of the present invention, the preparation method may further comprise removing at least part of metal ions from the polymerization reaction mixture to obtain a purified polymerization reaction mixture. The polymerization reaction mixture may be washed to remove at least part of the metal ions.

In one preferred embodiment, a method for removing at least part of metal ions from the polymerization reaction mixture comprises mixing the polymerization reaction mixture with a washing solution, and separating an oil phase from the mixture, wherein the washing solution is water or an aqueous solution containing an acid. In this preferred embodiment, the acid is preferably an inorganic acid, more preferably one or two or more of sulfuric acid, nitric acid, hydrochloric acid and carbonic acid. When the acid is carbonic acid, carbonic acid may be formed by introducing carbon dioxide gas into a mixture of the polymerization reaction mixture and water and/or adding dry ice to the polymerization reaction mixture.

In one more preferred example of this preferred embodiment, the washing solution includes a first washing solution and a second washing solution, the first washing solution is an aqueous solution containing an acid I, the second washing solution is an aqueous solution containing an acid II, the acid I is one or two or more of sulfuric acid, hydrochloric acid, and nitric acid, the acid II is carbonic acid, and the method for removing at least part of metal ions from the polymerization reaction mixture comprises mixing the polymerization reaction mixture with the first washing solution to obtain a first mixture, separating a first oil phase from the first mixture, and removing at least part of the polymerization solvent from the first oil phase to obtain a crude liquid polybutadiene product; and mixing the first oil phase with water in the presence of carbon dioxide to obtain a second mixture, separating a second oil phase from the second mixture, and removing at least part of volatile components from the second oil phase to obtain liquid polybutadiene. In this more preferred example, a weight ratio of the first washing solution to 1,3-butadiene is preferably 0.5-5:1, more preferably 2-4:1, a molar ratio of the acid I in the first washing solution to the organolithium initiator is preferably 0.1-1.5:1, more preferably 0.2-1:1, further preferably 0.3-0.6:1, and the acid I is based on Et; and a weight ratio of the second washing solution to 1,3-butadiene is 1-2:1. A molar ratio of the acid II in the second washing solution to the organolithium initiator is preferably 0.1-1.5:1, more preferably 0.2-1:1, further preferably 0.3-0.6:1, and the acid II is based on Et.

According to a third aspect of the present invention, the present invention provides liquid polybutadiene prepared by the method according to the second aspect of the present invention.

The liquid polybutadiene prepared by the method according to the second aspect of the present invention has not only a high vinyl content, but also a narrow molecular weight distribution and at the same time a suitable molecular weight and dynamic viscosity. The liquid polybutadiene according to the present invention has good flowability, good film formability, and good coating performance, and in particular a coating formed with a coating containing the liquid polybutadiene according to the present invention has an improved adhesion force to a substrate.

According to a fourth aspect of the prevent invention, the present invention provides a composition, including the liquid polybutadiene and at least one additive, wherein the liquid polybutadiene is the liquid polybutadiene according to the first aspect of the present invention.

The additive may be a substance capable of endowing the composition with new properties and/or improving the existing properties of the composition. As one preferred example, the additive includes an antioxidant. The antioxidant may be of a conventional choice, for example, the antioxidant may be a phenolic and/or amine antioxidant. In particular, the antioxidant may be one or two or more of 2-methyl-4,6-bi s(octylsulfanylmethyl)phenol, pentaerythritol tetrakis[3-(3, 5-di-tert-butyl-4-hydroxyphenyl)propionate] (i.e., an antioxidant 264), tris(2,4-di-tert-butylphenyl) phosphite (i.e., an antioxidant 168), octadecyl 3-(3,5-di-tert-butyl-4-hydroxyphenyl)propionate (i.e., an antioxidant 1076), 2,6-di-tert-butyl-p-cresol, tert-butylcatechol, and 2,2'-methylene-bis(4-methyl-6-tert-butylphenol). The content of the antioxidant may be 0.005-2 parts by weight, preferably 0.01-1 part by weight relative to 100 parts by weight of the liquid polybutadiene.

According to a fifth aspect of the present invention, the present invention provides a polymer coating, comprising the liquid polybutadiene according to the first or third aspect of the present invention, or the composition according to the fourth aspect of the present invention.

The polymer coating according to the present invention has a high adhesion force to a substrate.

According to a sixth aspect of the present invention, the present invention provides an adhesive, comprising the liquid polybutadiene according to the first or third aspect of the present invention, or the composition according to the fourth aspect of the present invention.

According to a seventh aspect of the present invention, the present invention provides a crosslinking agent, comprising the liquid polybutadiene according to the first or third aspect of the present invention, or the composition according to the fourth aspect of the present invention.

According to an eighth aspect of the present invention, the present invention provides application of the liquid polybutadiene according to the first or third aspect of the present invention, or the composition according to the fourth aspect of the invention as a crosslinking agent, an adhesive or an electrically insulating material.

The present invention will be described in detail below with reference to examples without thereby limiting the scope of the present invention.

Where not specifically stated, normal temperature and room temperature both mean 25±3° C.

In the following Examples and Comparative examples, the content of 1,2-structural unit of the liquid polybutadiene was determined by using a Bruker AVANCE 400 type superconducting nuclear magnetic resonance spectrometer, wherein a resonance frequency of 41 nucleus was 300.13 MHz, a spectral width was 2747.253 Hz, a pulse width was 5.0 µs, a data point was 16 K, a sample tube has a diameter of 5 mm, a solvent was deuterated chloroform ($CDCl_3$), the sample concentration was 15 mg/mL, the test temperature was normal temperature, the number of scans was 16, and calibration was performed with a tetramethylsilane chemical shift being 0 ppm.

In the following Examples and Comparative examples, the molecular weight and molecular weight distribution index of the liquid polybutadiene were determined by using gel permeation chromatography, wherein the gel permeation chromatography adopted a gel permeation chromatograph HLC-8320 from Tosoh Corp, a chromatographic column was TSKgel SuperMultiporeHZ-N, a standard column was TSKgel SuperMultiporeHZ, a solvent was chromatographically pure tetrahydrofuran (THF), narrow distribution polystyrene was used as a standard sample, a polymer sample was prepared into a tetrahydrofuran solution at a mass concentration of 1 mg/mL, an injection volume was 10.00 µL, a flow rate was 0.35 mL/min, and the test temperature was 40.0° C.

In the following Examples and Comparative examples, the glass transition temperature of the liquid polybutadiene was determined by using a TA-2980 DSC differential scanning calorimeter according to the method specified in GB/T 29611-2013 Raw Rubber, Glass Transition Temperature, with a heating rate of 20° C./min.

In the following Examples and Comparative examples, the content of metal elements in the liquid polybutadiene was determined by a plasma method, and a specific test method was as follows: an Optima 8300 full spectrum direct reading ICP spectrometer from Perkin Elmer (PE), USA, equipped with an echelle grating, a solid state detector, and dual optical path dual solid state detectors in the ultraviolet and visible regions was used, and a flat panel plasma technology was used; and the instrument operating parameters were as follows: a high frequency power of 1300 W, a plasma gasflow of 15 L/min, an atomizing gasflow of 0.55 L/min, an auxiliary gasflow of 0.2 L/min, a peristaltic pump speed of 1.50 mL/min, the integration time of 10 s, and plasma axial observation. A sample preparation method was as follows: 2.000 g of a sample was accurately weighed in a porcelain crucible, the porcelain crucible with the sample was placed in a high temperature resistance furnace and gradually heated to 500° C., after ashing was completed, the ashed material was taken out, 5 mL of 10% (V %) diluted nitric acid was added, followed by slowly heating on a hot plate until the ashed material was completely dissolved, the obtained solution was evaporated to dryness, 1 mL of concentrated nitric acid (a concentration of 68 vol %) was added, the resulting solution was transferred into a 50 mL volumetric flask, and the volume was made up with water to a constant volume while preparing a reagent blank solution.

In the following Examples and Comparative examples, the dynamic viscosity of the liquid polybutadiene at 45° C. was determined with reference to the capillary method specified in GBT10247-2008, wherein the dynamic viscosity was determined by using an Ubbelohde viscometer with a size number of 4B at a temperature of 45° C.

In the following Examples and Comparative examples, the following chemical reagents were involved:

antioxidant 264, antioxidant 168, and antioxidant 1076: purchased from Sinopharm Chemical Reagent Co., Ltd.;

cyclohexane: purchased from Sinopharm Chemical Reagent Co., Ltd., having a purity of greater than 99.9%, soaked for 15 days with a molecular sieve, and having a water content of less than 5 ppm (the weight content);

1,3-butadiene: polymer grade, purchased from Yanshan petrochemical;

n-butyllithium: purchased from J&K Chemicals, a 1.6 mol/L solution in hexane;

diethylene glycol dimethyl ether (2G, with a molecular weight of 134): purchased from J&K Chemicals, analytically pure;

diethylene glycol diethyl ether: purchased from J&K Chemicals, analytically pure;

diethylene glycol dibutyl ether: purchased from J&K Chemicals, analytically pure;

1,2-dipiperidylethane (DPE, with a molecular weight of 196): purchased from J&K Chemicals, analytically pure;

sodium tert-amylate (STA, with a molecular weight of 110): purchased from J&K Chemicals, a 1.4 mol/L solution in tetrahydrofuran;

sodium mentholate (SMT, with a molecular weight of 178): supplied by Innochem, a 1.0 mol/L solution in tetrahydrofuran;

sodium ethoxide (SEO, with a molecular weight of 68): purchased from J&K Chemicals, having a purity of 96%, and prepared into a 0.2 mol/L solution in tetrahydrofuran;

N,N,N',N'-tetramethylethylenediamine (TMEDA): purchased from J&K Chemicals, analytically pure;

methylmorpholine: purchased from Sinopharm Chemical Reagent Co., Ltd., analytically pure;

sulfuric acid: purchased from J&K Chemicals, having a concentration of 98% by weight, and prepared into a 20 wt % solution with water; and nitric acid: purchased from Sinopharm Chemical Reagent Co., Ltd., having a concentration of 68% by weight, and prepared into a 20 wt % solution with water.

Example 1

This example served to illustrate the liquid polybutadiene of the present invention and the preparation method therefor.

(1) Under nitrogen protection, cyclohexane, a structure modifier 1, a structure modifier 2, and 1,3-butadiene (the types and amounts are shown in Table 1, and the amounts listed in the table are all based on pure compounds) were added into a 5 L reactor, the temperature of the reactor was controlled to be 10° C. or less, and a designed amount of n-butyllithium (the amounts are shown in Table 1, and the amounts listed in the table are all based on pure compounds) was added into the 5 L reactor; and an anionic polymerization reaction was carried out at the temperatures and reaction pressures listed in Table 1 to obtain a polymerization reaction mixture comprising polybutadiene.

(2) To the polymerization reaction mixture obtained in the step (1), water and an acid were added (specific amounts and types of acids are listed in Table 2, and the amounts listed in the table are based on pure compounds), after stirring for 15 min, the stirred material was allowed to stand for layering, an aqueous phase was separated out, and the resulting oil phase was distilled under reduced pressure to obtain a crude liquid polybutadiene product.

(3) Water was added into the crude liquid polybutadiene product obtained in the step (2), carbon dioxide gas was introduced with stirring, then the mixture was allowed to stand for layering (specific amounts of water and carbon dioxide are listed in Table 2), an aqueous phase was separated out, the resulting oil phase was distilled under reduced pressure, and an antioxidant (specific amounts and types are listed in Table 2) was added to a distillation residue to obtain a composition PB1 comprising the liquid polybutadiene according to the present invention. The structural property parameters of the prepared liquid polybutadiene are listed in Table 3.

Examples 2-7

Examples 2-7 served to illustrate the liquid polybutadiene of the present invention and the preparation method therefor.

In Examples 2-7, liquid polybutadiene was prepared by using the same method as that in Example 1, except that compositions PB2-PB7 comprising the liquid polybutadiene according to the present invention were prepared under the conditions listed in Table 1, wherein the structural property parameters of the prepared liquid polybutadiene are listed in Table 3.

Example 8

This example served to illustrate the liquid polybutadiene of the present invention and the preparation method therefor.

Liquid polybutadiene was prepared by using the same method as that in Example 1, except that n-butyllithium was added in an amount of 50 mmol, obtaining a composition PB8 comprising the liquid polybutadiene according to the present invention, wherein the structural property parameters of the prepared liquid polybutadiene are listed in Table 3.

Example 9

This example served to illustrate the liquid polybutadiene of the present invention and the preparation method therefor.

Liquid polybutadiene was prepared by using the same method as that in Example 1, except that the amount of water used in the step (2) was 200 g, obtaining a composition PB9 comprising the liquid polybutadiene according to the present invention, wherein the structural property parameters of the prepared liquid polybutadiene are listed in Table 3.

Example 10

This example served to illustrate the liquid polybutadiene of the present invention and the preparation method therefor.

Liquid polybutadiene was prepared by using the same method as that in Example 1, except that the amount of sulfuric acid used in the step (2) was 30 mmol, obtaining a composition PB10 comprising the liquid polybutadiene according to the present invention, wherein the structural property parameters of the prepared liquid polybutadiene are listed in Table 3.

Example 11

This example served to illustrate the liquid polybutadiene of the present invention and the preparation method therefor.

Liquid polybutadiene was prepared by using the same method as that in Example 1, except that the step (3) was not carried out, obtaining a composition PB11 comprising the liquid polybutadiene according to the present invention, wherein the structural property parameters of the prepared liquid polybutadiene are listed in Table 3.

Example 12

This example served to illustrate the liquid polybutadiene of the present invention and the preparation method therefor.

Liquid polybutadiene was prepared by using the same method as that in Example 1, except that the acid used in the step (2) was nitric acid, and the molar amount of nitric acid was the same as that of sulfuric acid in Example 1 in terms of W, obtaining a composition PB12 comprising the liquid polybutadiene according to the present invention, wherein the structural property parameters of the prepared liquid polybutadiene are listed in Table 3.

Example 13

This example served to illustrate the liquid polybutadiene of the present invention and the preparation method therefor.

Liquid polybutadiene was prepared by using the same method as that in Example 1, except that the structure modifier 1 was diethylene glycol diethyl ether in the step (1), obtaining a composition PB13 comprising the liquid polybutadiene according to the present invention, wherein the structural property parameters of the prepared liquid polybutadiene are listed in Table 3.

Example 14

This example served to illustrate the liquid polybutadiene of the present invention and the preparation method therefor.

Liquid polybutadiene was prepared by using the same method as that in Example 1, except that the structure modifier 1 was diethylene glycol dibutyl ether in the step (1), obtaining a composition PB14 comprising the liquid polybutadiene according to the present invention, wherein the structural property parameters of the prepared liquid polybutadiene are listed in Table 3.

Comparative Example 1

Liquid polybutadiene was prepared by using the same method as that in Example 1, except that the amount of diethylene glycol dimethyl ether as the structure modifier 1 used in the step (1) was 0.4 g, obtaining a composition DPB1 comprising liquid polybutadiene, wherein the structural property parameters of the prepared liquid polybutadiene are listed in Table 3.

Comparative Example 2

Liquid polybutadiene was prepared by using the same method as that in Example 1, except that sodium tert-amylate as the structure modifier 2 was not used, but only diethylene glycol dimethyl ether as the structure modifier 1 was used in the step (1), obtaining a composition DPB2 comprising liquid polybutadiene, wherein the structural property parameters of the prepared liquid polybutadiene are listed in Table 3.

Comparative Example 3

Liquid polybutadiene was prepared by using the same method as that in Example 1, except that the polymerization reaction was carried out at 50° C. in the step (1), obtaining a composition DPB3 comprising liquid polybutadiene, wherein the structural property parameters of the prepared liquid polybutadiene are listed in Table 3.

Comparative Example 4

Liquid polybutadiene was prepared by using the same method as that in Example 1, except that in the step (1), the polymerization reaction was carried out at 50° C., sodium tert-amylate as the structure modifier 2 was not used, and only diethylene glycol dimethyl ether as the structure modifier 1 was used, obtaining a composition DPB4 comprising liquid polybutadiene, wherein the structural property parameters of the prepared liquid polybutadiene are listed in Table 3.

Comparative Example 5

Polybutadiene was prepared by using the same method as that in Example 1, except that n-butyllithium was used in an amount of 3 mmol in the step (1), obtaining a composition DPB5 comprising polybutadiene, wherein the structural property parameters of the prepared polybutadiene are listed in Table 3.

Comparative Example 6

Polybutadiene was prepared by using the same method as that in Example 1, except that in the step (1), n-butyllithium was used in an amount of 3 mmol, diethylene glycol dimethyl ether was used in an amount of 0.08 g and sodium tert-amylate was used in an amount of 0.3 mmol, obtaining a composition DPB6 comprising polybutadiene, wherein the structural property parameters of the prepared polybutadiene are listed in Table 3.

Comparative Example 7

Liquid polybutadiene was prepared by using the same method as that in Example 1, except that in the step (1), the solvent was tetrahydrofuran in an amount of 2300 g, the initiator was sodium naphthalene in an amount of 70 mmol, and diethylene glycol dimethyl ether and sodium tert-amylate were not added, obtaining a composition DPB7 comprising polybutadiene, wherein the structural property parameters of the prepared polybutadiene are listed in Table 3.

Comparative Example 8

Liquid polybutadiene was prepared by using the same method as that in Example 1, except that in the step (1), diethylene glycol dimethyl ether was replaced by an equal amount of TMEDA, and STA was replaced by an equal amount of SMT, obtaining a composition DPB8 comprising liquid polybutadiene, wherein the structural property parameters of the prepared liquid polybutadiene are listed in Table 3.

Comparative Example 9

Liquid polybutadiene was prepared by using the same method as that in Example 1, except that in the step (1), diethylene glycol dimethyl ether was replaced by TMEDA and STA was not added, obtaining a composition DPB9 comprising liquid polybutadiene, wherein the structural property parameters of the prepared liquid polybutadiene are listed in Table 3.

Comparative Example 10

Liquid polybutadiene was prepared by using the same method as that in Example 1, except that in the step (1), diethylene glycol dimethyl ether was replaced by an equal amount of TMEDA, obtaining a composition DPB10 comprising liquid polybutadiene, wherein the structural property parameters of the prepared liquid polybutadiene are listed in Table 3.

Comparative Example 11

Liquid polybutadiene was prepared by using the same method as that in Example 1, except that in the step (1), n-butyllithium was used in an amount of 125 mmol, obtaining a composition DPB11 comprising liquid polybutadiene, wherein the structural property parameters of the prepared liquid polybutadiene are listed in Table 3.

Comparative Example 12

A 1 L flask was charged with 338 g of n-hexane and cooled to −40° C. 25 ml of a solution of sec-butyllithium in cyclohexane (1.0 mol·L$^{-1}$) was added to the flask, then 84 g of butadiene liquefied at −78° C. was added dropwise, then 18 g of THF was added to a polymerization liquid, and stirring was performed at −20° C. for 4 h to obtain liquid polybutadiene DPB12, wherein the structural properties of the prepared liquid polybutadiene are listed in Table 3.

Comparative Example 13

A 1 L flask was charged with 338 g of n-hexane and cooled to −40° C. 85 ml of a solution of sec-butyllithium in cyclohexane (1.0 mol·L$^{-1}$) was added to the flask, then 84 g of butadiene liquefied at −78° C. was added dropwise, then 18 g of THF was added to a polymerization liquid, and stirring was performed at −20° C. for 120 min to obtain liquid polybutadiene DPB13, wherein the structural properties of the prepared liquid polybutadiene are listed in Table 3.

Comparative Example 14

A 1 L flask was charged with 338 g of n-hexane and cooled to −40° C. 56 ml of a solution of sec-butyllithium in cyclohexane (1.0 mol·L$^{-1}$) was added to the flask, then 84 g of butadiene liquefied at −78° C. was added dropwise, then 18 g of THF was added to a polymerization liquid, and stirring was performed at −20° C. for 120 min to obtain polybutadiene DPB14, wherein the structural properties of the prepared liquid polybutadiene are listed in Table 3.

Comparative Example 15

Liquid polybutadiene was prepared by using the same method as that in Example 7, except that in the step (1), 1,2-dipiperidylethane was replaced by an equal amount of methylmorpholine, obtaining a composition DPB15 comprising liquid polybutadiene, wherein the structural property parameters of the prepared liquid polybutadiene are listed in Table 3.

TABLE 1

| Example | 1 | 2 | 3 | 4 | 5 | 6 | 7 |
|---|---|---|---|---|---|---|---|
| Type of polymerization solvent | Cyclohexane | Cyclohexane | Cyclohexane | Cyclohexane | Cyclohexane | Cyclohexane | Cyclohexane |
| Amount of polymerization solvent/g | 2300 | 2300 | 2300 | 2300 | 2300 | 2300 | 2300 |
| Amount of 1,3-butadiene/g | 250 | 250 | 250 | 250 | 250 | 250 | 250 |
| Amount of n-butyllithium/mmol | 70 | 75 | 80 | 65 | 60 | 95 | 57 |
| Type of structure modifier 1 | 2G | 2G | 2G | 2G | DPE | 2G | DPE |
| Amount of structure modifier 1/g | 1.2 | 1 | 2 | 1 | 1.2 | 0.7 | 1 |
| Type of structure modifier 2 | STA | STA | STA | STA | SEO | STA | STA |
| Amount of structure modifier 2/mmol | 7 | 7.5 | 8 | 6.5 | 6 | 4 | 5 |
| Polymerization reaction temperature | 0° C. | 0° C. | 0° C. | 3° C. | 6° C. | 3° C. | 8° C. |
| Polymerization reaction pressure | 0.3 MPa | 0.3 MPa | 0.3 MPa | 0.3 MPa | 0.3 MPa | 0.3 MPa | 0.3 MPa |
| Polymerization reaction time | 90 min | 90 min | 90 min | 80 min | 70 min | 80 min | 70 min |

| Example | 1 | 8 | 13 | 14 |
|---|---|---|---|---|
| Type of polymerization solvent type | Cyclohexane | Cyclohexane | Cyclohexane | Cyclohexane |
| Amount of polymerization solvent/g | 2300 | 2300 | 2300 | 2300 |
| Amount of 1,3-butadiene/g | 250 | 250 | 250 | 250 |
| Amount of n-butyllithium/mmol | 70 | 50 | 70 | 70 |
| Type of structure modifier 1 | 2G | 2G | Diethylene glycol diethyl ether | Diethylene glycol dibutyl ether |
| Amount of structure modifier 1/g | 1.2 | 1.2 | 1.2 | 1.2 |
| Type of structure modifier 2 | STA | STA | STA | STA |
| Amount of structure modifier 2/mmol | 7 | 7 | 7 | 7 |
| Polymerization reaction temperature | 0° C. | 0° C. | 0° C. | 0° C. |
| Polymerization reaction pressure | 0.3 MPa | 0.3 MPa | 0.3 MPa | 0.3 MPa |
| Polymerization reaction time | 90 min | 90 min | 90 min | 90 min |

TABLE 2

| Example | Amount of water used in step (2)/g | Amount of acid used in step (2)/mmol | Amount of water used in step (3)/g | Amount of carbon dioxide used in step (3)/mmol | Amount of antioxidant 168 used/g |
|---|---|---|---|---|---|
| 1 | 750 | Sulfuric acid 42 | 400 | 28 | 0.1 |
| 2 | 750 | Sulfuric acid 45 | 400 | 30 | 0.1 |
| 3 | 750 | Sulfuric acid 48 | 400 | 32 | 0.1 |
| 4 | 750 | Sulfuric acid 39 | 400 | 26 | 0.1 |
| 5 | 750 | Sulfuric acid 36 | 400 | 24 | 0.1 |
| 6 | 750 | Sulfuric acid 57 | 400 | 38 | 0.1 |
| 7 | 750 | Sulfuric acid 34 | 400 | 23 | 0.1 |
| 9 | 200 | Sulfuric acid 42 | 400 | 28 | 0.1 |
| 10 | 750 | Sulfuric acid 30 | 400 | 28 | 0.1 |
| 12 | 750 | Nitric acid 42 | 400 | 28 | 0.1 |

TABLE 3

| No. | Mn | Mw/Mn | 1,2-PB[1] wt % | Cis-1,4[2] mol % | Trans-1,4[3] mol % | Dynamic viscosity@ 45° C./P | Tg/° C. | Content of Metal by weight/ppm |
|---|---|---|---|---|---|---|---|---|
| Example 1 | 3512 | 1.04 | 91.8 | 5.2 | 3.0 | 206 | −21 | 12 |
| Example 2 | 3346 | 1.04 | 91.4 | 5.5 | 3.1 | 184 | −22 | 14 |
| Example 3 | 3105 | 1.03 | 92.3 | 4.8 | 2.9 | 161 | −24 | 17 |
| Example 4 | 3872 | 1.04 | 90.6 | 5.9 | 3.5 | 252 | −19 | 14 |
| Example 5 | 4186 | 1.05 | 88.2 | 7.1 | 4.7 | 292 | −18 | 18 |
| Example 6 | 2687 | 1.04 | 87.8 | 7.3 | 4.9 | 122 | −27 | 23 |
| Example 7 | 4402 | 1.04 | 87.3 | 7.5 | 5.2 | 341 | −16 | 11 |
| Example 8 | 5046 | 1.04 | 92.4 | 4.7 | 2.9 | 463 | −13 | 12 |
| Example 9 | 3512 | 1.04 | 91.8 | 5.2 | 3.0 | 206 | −21 | 174 |

TABLE 3-continued

| No. | Mn | Mw/Mn | 1,2-PB[1] wt % | Cis-1,4[2] mol % | Trans-1,4[3] mol % | Dynamic viscosity@ 45° C./P | Tg/° C. | Content of Metal by weight/ppm |
|---|---|---|---|---|---|---|---|---|
| Example 10 | 3512 | 1.04 | 91.8 | 5.2 | 3.0 | 206 | −21 | 192 |
| Example 11 | 3512 | 1.04 | 91.8 | 5.2 | 3.0 | 206 | −21 | 188 |
| Example 12 | 3512 | 1.04 | 91.8 | 5.2 | 3.0 | 206 | −21 | 13 |
| Example 13 | 3524 | 1.04 | 88.7 | 6.7 | 4.6 | 213 | −23 | 11 |
| Example 14 | 3518 | 1.04 | 86.9 | 7.9 | 5.2 | 214 | −24 | 12 |
| Comparative example 1 | 3528 | 1.04 | 74.1 | 14.8 | 11.1 | 221 | −38 | 14 |
| Comparative example 2 | 3521 | 1.04 | 84.2 | 9.6 | 6.2 | 213 | −27 | 16 |
| Comparative example 3 | 3346 | 1.09 | 83.6 | 9.3 | 7.1 | 196 | −26 | 13 |
| Comparative example 4 | 3526 | 1.03 | 69.4 | 17.1 | 13.5 | 226 | −45 | 17 |
| Comparative example 5 | 54176 | 1.92 | 92.1 | 4.8 | 3.1 | / | / | / |
| Comparative example 6 | 92448 | 1.08 | 74.7 | 13.2 | 12.1 | / | / | / |
| Comparative example 7 | 3374 | 1.24 | 85.3 | 4.6 | 10.1 | 256 | −25 | 19 |
| Comparative example 8 | 3496 | 1.05 | 83.8 | 9.4 | 6.8 | 217 | −27 | 24 |
| Comparative example 9 | 3504 | 1.05 | 79.2 | 11.4 | 9.4 | 220 | −33 | 21 |
| Comparative example 10 | 3496 | 1.04 | 76.4 | 13.4 | 10.2 | 217 | −36 | 25 |
| Comparative example 11 | 2037 | 1.04 | 90.4 | 5.9 | 3.7 | 57 | −31 | 28 |
| Comparative example 12 | 3508 | 1.13 | 83.4 | 14.7 | 1.9 | 224 | −27 | 18 |
| Comparative example 13 | 1012 | 1.07 | 81.6 | 15.8 | 2.6 | 12 | −46 | 14 |
| Comparative example 14 | 1548 | 1.11 | 82.5 | 15.2 | 2.3 | 26 | −35 | 17 |
| Comparative example 15 | 3986 | 1.05 | 74.3 | 14.2 | 11.5 | 367 | −25 | 23 |
| B3000[4] | 3218 | 1.23 | 85.0 | 5.1 | 9.8 | 238 | −28 | 16 |
| B2000[5] | 2019 | 1.21 | 82.7 | 5.9 | 11.4 | 89 | −35 | 14 |

[1] the content of a 1,2-structural unit based on the total amount of polybutadiene
[2] the content of a cis-1,4-structural unit based on the total amount of polybutadiene
[3] the content of a trans-1,4-structural unit based on the total amount of polybutadiene
[4] and [5] liquid polybutadiene products from Nippon Soda Co., Ltd.

Test Example

The compositions prepared in Examples 1-14 uniformly coated a copper foil surface with a coating thickness of 0.6 mm, and were cured by crosslinking at 120° C. for 2 h, and the peel strength was determined by using the method specified in IPC-TM-650 2.4.08C, and the test results are listed in Table 4.

Test Comparative Example

The peel strength of the compositions prepared in Comparative examples 1-4 and 7-15 and B3000 and B2000 was determined by using the same method as that in the test example, and the test results are listed in Table 4.

TABLE 4

| Sample number | Peel strength (N/mm) |
|---|---|
| PB1 | 0.92 |
| PB2 | 0.90 |
| PB3 | 0.93 |
| PB4 | 0.90 |
| PB5 | 0.86 |
| PB6 | 0.86 |
| PB7 | 0.85 |
| PB8 | 0.88 |
| PB9 | 0.91 |
| PB10 | 0.90 |
| PB11 | 0.91 |
| PB12 | 0.92 |
| PB13 | 0.88 |
| PB14 | 0.85 |
| DPB1 | 0.71 |
| DPB2 | 0.82 |
| DPB3 | 0.81 |
| DPB4 | 0.68 |
| DPB7 | 0.83 |
| DPB8 | 0.81 |
| DPB9 | 0.76 |
| DPB10 | 0.73 |
| DPB11 | 0.78 |
| DPB12 | 0.82 |
| DPB13 | 0.57 |
| DPB14 | 0.64 |
| DPB15 | 0.71 |
| B3000 | 0.84 |
| B2000 | 0.79 |

As can be seen from Tables 3 and 4, the liquid polybutadiene according to the present invention not only has a high content of the 1,2-structural unit, a narrow molecular weight distribution, but also has a moderate molecular weight as well as a moderate dynamic viscosity at 45° C., and has good flow flowability, good coating performance and good film formability, and the polymer coating formed after cured by crosslinking has strong adhesion to a substrate. Wherein, the liquid polybutadiene prepared in Comparative examples 11, 13 and 14 had low dynamic viscosity, poor coating performance and poor film formability, and it is difficult for the liquid polybutadiene to form a polymer coating with uniform thickness and uniform performance.

In addition, the liquid polybutadiene according to the present invention has a low metal ion content. The liquid polybutadiene according to the present invention is suitable as a crosslinking agent, an adhesive or an electrically insulating material.

Preferred embodiments of the present invention are described above in detail, but the present invention is not limited thereto. Within the technical concept range of the present invention, the technical solution of the present invention can be subjected to various simple variations, including the combination of various technical features in any other suitable manner, and these simple variations and combinations should likewise be considered as the contents disclosed by the present invention, and all fall within the protection scope of the present invention.

The invention claimed is:

1. A liquid polybutadiene, having a number-average molecular weight of 2,500-5,500, and a molecular weight distribution index of 1-1.2, wherein based on the total amount of the liquid polybutadiene, the content of a 1,2-structural unit in the liquid polybutadiene is 85-95 wt %, and the content of a 1,4-structural unit in the liquid polybutadiene is 5-15 wt %, wherein a molar ratio of a cis-1,4-structural unit to a trans-1,4-structural unit in the liquid polybutadiene is 1-2:1; and the dynamic viscosity of the liquid polybutadiene at 45° C. is 100-500 P.

2. The liquid polybutadiene according to claim 1, wherein the molar ratio of the cis-1,4-structural unit to the trans-1,4-structural unit in the liquid polybutadiene is 1.3-1.9:1 or 1.65-1.75:1.

3. The liquid polybutadiene according to claim 1, wherein the content of the 1,2-structural unit in the liquid polybutadiene is 87-94 wt % or 90-93 wt %, based on the total amount of the liquid polybutadiene.

4. The liquid polybutadiene according to claim 1, wherein the liquid polybutadiene has a number-average molecular weight of 2,800-5,000 or 3,000-4,500; or
the liquid polybutadiene has a molecular weight distribution index of 1.01-1.09, preferably or 1.02-1.06.

5. The liquid polybutadiene according to claim 1, wherein the weight content of metal elements in the liquid polybutadiene is 200 ppm or less, or 100 ppm or less, or 50 ppm or less, or 20 ppm or less based on the total amount of the liquid polybutadiene.

6. The liquid polybutadiene according to claim 1, wherein the liquid polybutadiene has a glass transition temperature of −32° C. to −12° C. or −27° C. to −17° C.

7. The liquid polybutadiene according to claim 1, wherein the dynamic viscosity of the liquid polybutadiene at 45° C. is 150-350P, or 170-300P, or 180-250P.

8. The liquid polybutadiene according to claim 1, wherein the liquid polybutadiene has a number-average molecular weight of 2,500-4,000 or 3,000-4,000, or the dynamic viscosity of the liquid polybutadiene at 45° C. is 100-280P or 150-260P; or
the liquid polybutadiene has a molecular weight distribution index of 1-1.05.

9. The liquid polybutadiene according to claim 1, wherein the liquid polybutadiene has a number-average molecular weight of greater than 4000 and not more than 5500, and the dynamic viscosity of the liquid polybutadiene at 45° C. is greater than 280 P and not more than 500P or 280-480P; or
the liquid polybutadiene has a molecular weight distribution index of 1-1.08.

10. A preparation method for liquid polybutadiene, comprising contacting 1,3-butadiene with a structure modifier and an organolithium initiator in a polymerization solvent under anionic polymerization reaction conditions to obtain a polymerization reaction mixture comprising polybutadiene, wherein the contacting is carried out at a temperature of −10° C. to 20° C.; the structure modifier comprises a component A and a component B, wherein the component A is one or two or more selected from the group consisting of ethers and amines, and the component B is one or two or more selected from the group consisting of alkali metal alkoxides; a molar ratio of the organolithium initiator to the component A to the component B is 1:0.05-0.3:0.03-0.2, the amount organolithium initiator is calculated based on lithium; the component A is one or two or more selected from the group consisting of diethylene glycol dimethyl ether, diethylene glycol diethyl ether, diethylene glycol di-n-propyl ether, diethylene glycol di-n-butyl ether, and a compound shown in formula II,

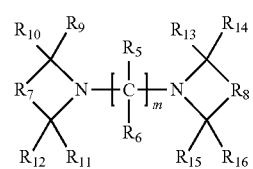

in formula II, $R_5$ and $R_6$ are the same or different, and are each independently a hydrogen atom or $C_1$-$C_6$ alkyl,
$R_7$ and Rs are the same or different, and are each independently $C_1$-$C_6$ alkylene, and $R_9$, $R_{10}$, $R_{11}$, $R_{12}$, $R_{13}$, $R_{14}$, $R_{15}$, and $R_{16}$ are the same or different, and are each independently a hydrogen atom or $C_1$-$C_6$ alkyl, and
m is an integer of 1-5.

11. The method according to claim 10, wherein the component A is one or two or more selected from the group consisting of diethylene glycol dimethyl ether, diethylene glycol diethyl ether, diethylene glycol di-n-propyl ether, diethylene glycol di-n-butyl ether, and 1,2-dipiperidylethane.

12. The method according to claim 10, wherein the alkali metal alkoxide is one or two or more selected from the group consisting of compounds represented by formula III,

in formula III, $R_{17}$ is $C_1$-$C_{20}$ alkyl, $C_6$-$C_{30}$ aryl or $C_4$-$C_{20}$ cycloalkyl, and
M is an alkali metal atom; or
the component B is one or two or more selected from the group consisting of sodium tert-butoxide, sodium tert-amylate, sodium mentholate, sodium ethoxide, and sodium n-hexylate.

13. The method according to claim 10, wherein the molar ratio of the organolithium initiator to the component A to the component B is 1:0.1-0.2:0.05-0.15, and the amount of the organolithium initiator is calculated based on lithium; or
a molar ratio of the component B to the component A is 0.4-1.5:1 or 0.5-1:1.

14. The method according to claim 10, wherein the organolithium initiator is used in an amount such that the prepared liquid polybutadiene has a number-average molecular weight of 2,500-5,500, or 2,800-5,000, or 3,000-4,500; or the organolithium initiator is one or more selected from the group consisting of compounds represented by formula IV,

$R_{18}Li$  IV in formula IV, $R_{18}$ is $C_1$-$C_6$ alkyl, $C_3$-$C_{12}$ cycloalkyl, $C_7$-$C_{14}$ aralkyl, or $C_6$-$C_{12}$ aryl;

or the organolithium initiator is n-butyllithium and/or sec-butyllithium.

15. The method according to claim 10, wherein the contacting is carried out at a temperature of −5° C. to 10° C.; or the content of 1,3-butadiene is 1-15 wt % or 4-10 wt % based on the total amount of the polymerization solvent and 1,3-butadiene.

16. A liquid polybutadiene prepared by the method according to claim 10.

17. A composition, comprising liquid polybutadiene and at least one additive, wherein the liquid polybutadiene is the liquid polybutadiene according to claim 1.

18. A polymer coating, comprising the liquid polybutadiene according to claim 1.

19. An adhesive, comprising the liquid polybutadiene according to claim 1.

20. A crosslinking agent, comprising the liquid polybutadiene according to claim 1.

* * * * *